W. A. T. MÜLLER.
MEANS FOR OPERATING ELECTRIC MOTORS DRIVING MOTOR TRAINS.
APPLICATION FILED MAR. 1, 1911.
992,682.
Patented May 16, 1911.
2 SHEETS—SHEET 2.
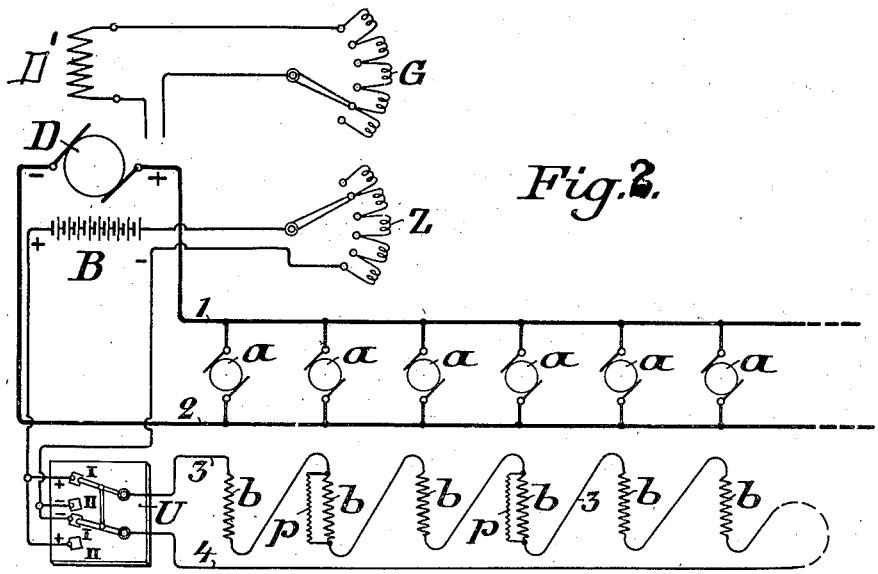
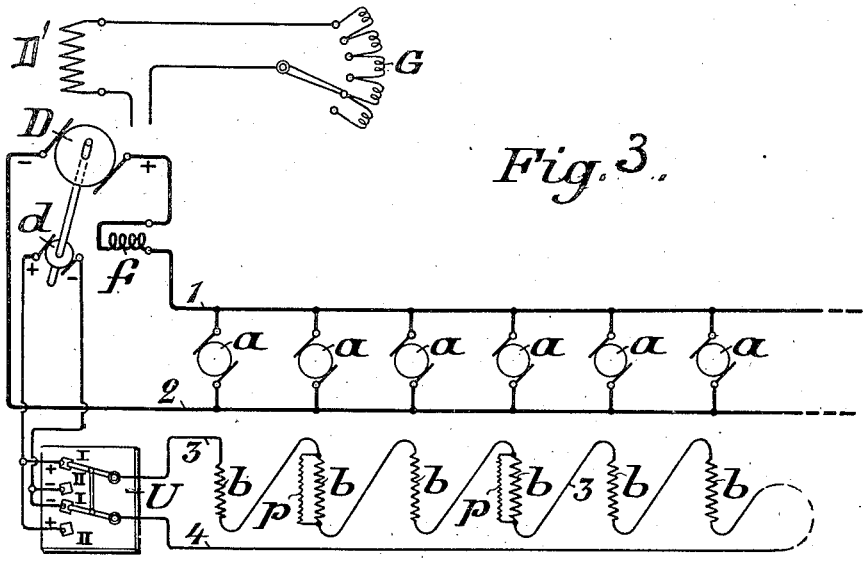
WITNESSES
INVENTOR

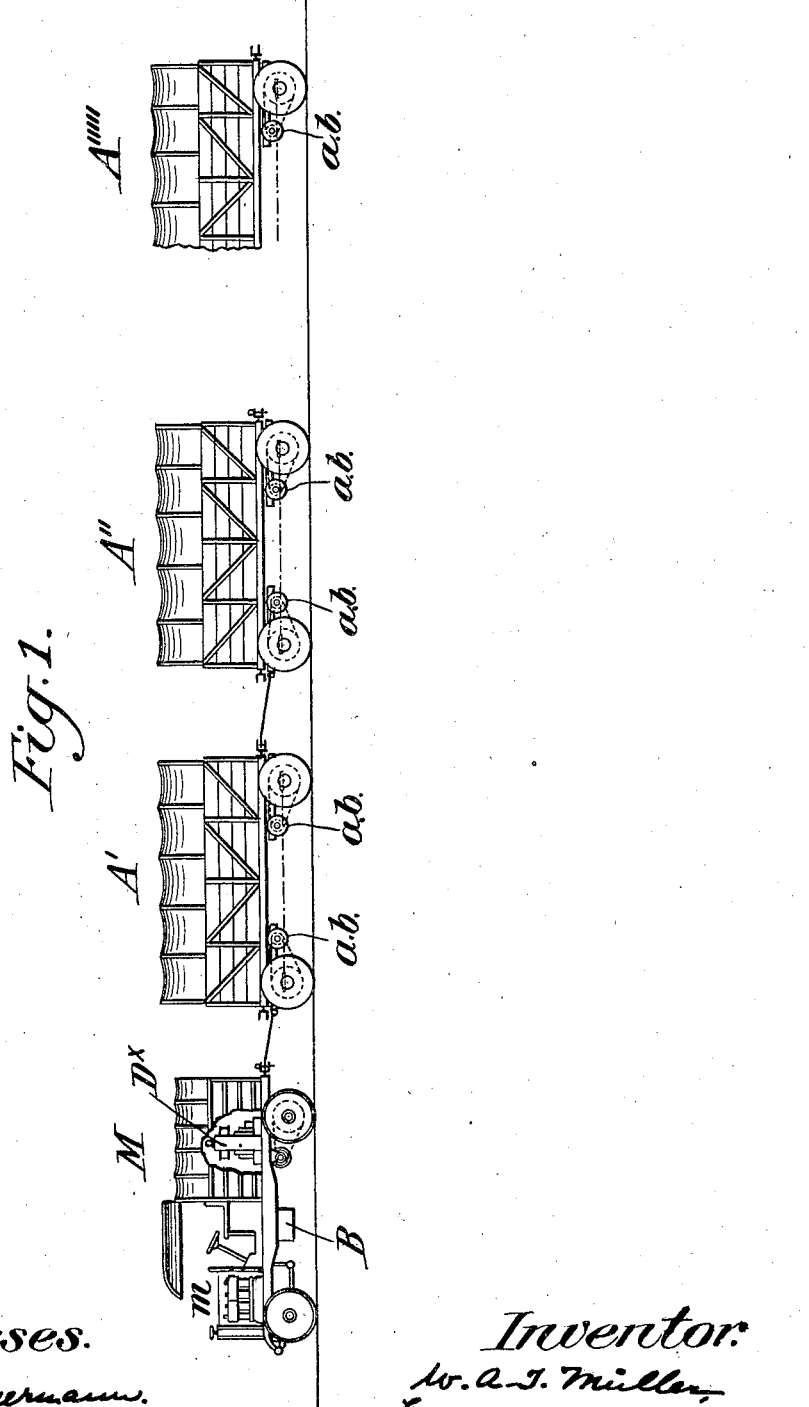

UNITED STATES PATENT OFFICE.

WILHELM ADOLF THEODOR MÜLLER, OF BERLIN-STEGLITZ, GERMANY.

MEANS FOR OPERATING ELECTRIC MOTORS DRIVING MOTOR-TRAINS.

992,682.         Specification of Letters Patent.     Patented May 16, 1911.

Application filed March 1, 1911. Serial No. 611,715.

*To all whom it may concern:*

Be it known that I, WILHELM ADOLF THEODOR MÜLLER, engineer, a subject of the German Emperor, residing at 5 Feldstrasse, Berlin-Steglitz, Germany, have invented certain new and useful Improvements in Means for Operating Electric Motors Driving Motor-Trains; and I do hereby declare the following to be a full, clear, and exact description of the invention, such as will enable others skilled in the art to which it appertains to make and use the same.

This invention has for its object to provide improved means for operating and controlling the electric motors of a motor train, in such a manner that said motors may be run forward or backward, and electric braking may be effected, from the car or vehicle of the driver, without the necessity of providing controlling switches on the other cars or vehicles of the train.

The invention consists substantially in supplying current from different sources to the armature winding and the field winding of each electric motor of the train, in the manner to be hereinafter described.

In the accompanying drawing, Figure 1 is a general side elevation of a wagon train embodying the invention, which train is adapted to travel on ordinary roads or highways, although the invention is obviously not limited to this feature. Fig. 2 is a diagram of the motor control system used in connection with the above mentioned train, and Fig. 3 is a diagrammatic view of a modified system.

In the drawing M indicates the driver's vehicle of the train, which is preferably arranged at the front, and which has coupled thereto a series of vehicles A′ A″ ... A″″″. On the driver's vehicle is a dynamo $D^x$ having an armature D and field D′, as shown in Figs. 2 and 3. This dynamo is driven by means of an internal combustion motor $m$ or the like on the driver's vehicle, by means of a suitable transmission (not shown), and it is either self-excited or separately excited in such a manner that the electric pressure can be varied in the ordinary way by means of a controller G, the manipulation of which controls the speed of the train from a standstill through very small increments up to the maximum. The individual attached vehicles A′ A″ ... A″″″ are driven by means of electric motors $a$, $b$; of which any appropriate number may be used on each vehicle, and said motors comprise armatures $a$ and field windings $b$, as shown in Figs. 2 and 3. The armatures $a$ are shown as connected in parallel by means of leads or mains 1 and 2 which extend from the dynamo $D^x$ throughout the length of the train. The field windings $b$ of the several motors are shown as being connected in series by means of leads or mains 3 and 4 which are quite separate from and independent of the main leads 1 and 2, and also extend through the train. The leads 3 and 4 are connected with a pole changing switch U for reversing purposes, and this switch is in turn connected with a source of current separate from the main dynamo armature.

In the arrangement shown in Fig. 2 the separate source of current for the fields of the several motors is constituted by a storage battery B, which may be conveniently stored on the train, preferably on the driver's vehicle, as shown. This battery, which is connected with the switch U in the manner indicated, is adapted to be charged by the main dynamo $D^x$ and to be controlled by a suitable controller Z. With the arrangement described there is no necessity for separate setting of the switch U for operating the brakes, and also there is no necessity for providing a separate resistance for destroying the braking energy. The current which is generated in the armatures $a$ of the electric motors in braking, passes directly into the dynamo armature D, so that the latter running as an electric motor drives its own driving motor (that is the internal combustion motor $m$ or the like). If desired the train can be braked by merely throttling the supply of gas to the driving motor. In such a case the driving motor is kept in motion by the brake energy, notwithstanding the said throttling. Consequently the brake energy is destroyed by the consumption of energy due to the friction produced by the to-and-fro motion of the motor piston or pistons running idly, by the friction of the crank shaft bearings, and by the back pressure due to the compression in the motor cylinder or cylinders. The arrangement described also has the additional advantage that a powerful braking action can be produced by means of the adjustable excitation of the field windings $b$ afforded by the rheostat-controlled storage battery current, even when the train is stationary or moving at a very low speed, so that the train can be started on an incline with the mechanical brakes in their off position. In the ordinary braking systems, the rotation of the motor armature is essential to the generation of a braking current, as is well understood, but in the present instance, a powerful magnetic braking action may be exerted on the armatures so long as there is no current flowing through them, by suitably exciting the corresponding field windings which therefore tend to prevent rotation of the armatures.

In the arrangement shown in Fig. 3, the current for the motor fields is taken from a separate and independent dynamo $d$, $f$, which may be conveniently arranged in proximity to the main dynamo, although this is not essential. The system differs from that shown in Fig. 2 in so far that the supply of current to the field windings is influenced automatically by the main supply of current from the dynamo $D^x$ in such a manner that a determined ratio is established between the current strength in the electric motor armatures and the current strength in the field magnets. This is important because, as is well known, the field magnets of electric motors must not have too weak excitation relatively to the armature currents. For this purpose, the field winding $f$, of the dynamo $d$, $f$ for supplying current to the motor fields, is composed of a few turns of coarse wire, so that the main current can be led directly through this field winding. The result of this is that the electrical pressure of the current of dynamo armature $d$ is proportional to the current supplied to the motor armatures, up to a certain degree, i. e., the point of approximate saturation of the field $f$; and the pressure of said dynamo armature current will become higher as additional vehicles are coupled to the train, owing to the fact that increased current will be sent through the motor armature circuit because of the increase in the number of parallel-connected armatures. With the field windings $b$ connected in series by means of the supply leads 3, 4, as shown, the strength of the current in the field magnet windings can be kept constant, notwithstanding an alteration in the number of the vehicles in the train, because, as above noted, the pressure or tension supplied from the dynamo armature $d$ is proportional to the number of vehicles, and the resistance of the series-connected motor fields $b$ is also proportional to the number of vehicles. As the tension and the resistance in the motor field circuit increase and decrease in the same ratio, the current must obviously remain constant. The described arrangement also has the effect that the fluctuations of current in the armatures due to the variations in the resistance of the road or track, will also occur in the field magnets in approximately the same degree as if each armature were connected in series with its own field. The arrangement shown in Fig. 3 has in other respects the same advantages as those possessed by the system shown in Fig. 2. For the purpose of braking, however, it is necessary to reverse the switch U because the braking current coming from the armatures $a$, has a reverse direction to the driving current, and consequently the current is also reversed in the armature $d$.

The series connection of the field magnet windings shown in the accompanying drawings has the advantage over their parallel connection, that all the field magnets receive exactly equal exciting currents, so that there is a great security that equal electro-motive forces will be produced in the armatures $a$. Any inequalities in the electro-motive forces such as may be due to inequalities in the iron magnets of the several electric motors, can be compensated very accurately by means of parallel resistances $p$ which are included as required.

It is obvious that the invention is applicable to trains of various types whether running on rails or on streets or roadways, and that I have not attempted to describe the various modifications which may be adopted without digressing from the invention.

I claim:—

1. In an electric motor train, a plurality of interconnected vehicles, electric motors on a plurality of said vehicles, a pair of mains extending through the train and permanently connecting in parallel the armatures of the several motors, a second pair of mains also extending through the train and permanently connecting in series the fields of the several motors, a pole changing reversing switch connected with said last named mains, a source of current on the train connected with said reversing switch, a dynamo on the driver's vehicle connected to said first named mains and having exciting means associated therewith, the field of said dynamo being separate from and unaffected by the current source of the motor field circuit, and a controller in connection with said dynamo and by means of which the speed of the train is regulated; substantially as described.

2. In an electric motor train, a plurality of connected vehicles, a dynamo on one of said vehicles, motors on other vehicles and each comprising an armature and a field, mains permanently connecting said dynamo with the armature windings of the several motors, and a separate source of current connected with the field windings of the several motors and automatically controlled by said dynamo to maintain predetermined relations between the currents in the circuits of the motor armatures and fields respectively; substantially as described.

3. In an electric motor train, a plurality of interconnected vehicles, a dynamo on the driver's vehicle, means for operating said dynamo, motors for driving other vehicles and each comprising an armature and a field winding, mains extending through the train from said dynamo and permanently connected to the several motor armatures, separate mains extending through the train and permanently connected with the several motor fields, a separate source of current connected with said last named mains and automatically controlled by said dynamo to maintain determined relations between the currents in the motor armatures and fields respectively, and controlling means for said dynamo whereby the speed of the train is regulated; substantially as described.

4. In an electric motor train, a plurality of interconnected vehicles, a dynamo on the driver's vehicle, means to operate said dynamo, a controller associated with said dynamo, electric motors on other vehicles, mains extending through the train from said dynamo and connecting in parallel the several motor armatures, said mains being permanently connected to said armatures, separate mains extending through the train and connecting in series the fields of the several motor armatures, a reversing switch connected with said last named mains, and a separate source of current on the train, connected with said reversing switch and controlled from said dynamo to maintain automatically determined relations between the currents in the armature and field circuits of the motors; substantially as described.

5. In an electric motor train, a plurality of interconnected vehicles, a dynamo on the driver's vehicle, means for operating said dynamo, electric motors on other vehicles, and each comprising an armature and a field-winding, mains extending through the train from said dynamo and permanently connecting in parallel the armatures of the several motors, a controller associated with the dynamo by means of which the speed of the train is regulated, mains extending through the train and permanently connecting in series the fields of the several motors, a reversing switch connected with said last named mains, and a second dynamo connected with said switch and having its field excited by the current flowing from said first named dynamo, so as to maintain automatically determined relations between the currents in the motor armature and field circuits; substantially as described.

In testimony whereof I have affixed my signature, in presence of two witnesses.

WILHELM ADOLF THEODOR MÜLLER.

Witnesses:
HENRY HASPER,
WOLDEMAR HAUPT.